INVENTOR
Daniel J. Aisanich
by McDougall Hersh, Scott and Ladd
Attys

United States Patent Office 3,449,551
Patented June 10, 1969

3,449,551
ANTISHOCK CONTROL DEVICES FOR ELECTRICALLY HEATED GLASS PANELS OR THE LIKE
Daniel J. Aisanich, Chicago, Ill., assignor to Ardco, Inc., Chicago, Ill., a corporation of Illinois
Filed Sept. 5, 1967, Ser. No. 665,333
Int. Cl. H05b 1/02
U.S. Cl. 219—511
20 Claims

ABSTRACT OF THE DISCLOSURE

An antishock control device, comprising contacts for normally supplying electrical power to the heating element of a glass panel, a first relay device responsive to the line voltage and having an action tending to open the contacts, and a second relay device responsive to the load current and having an action which nullifies or overpowers the action of the first relay device, so as to keep the contacts closed during normal operation, the contacts being opened in the event that the load current is interrupted by breakage of the glass panel or otherwise, whereby any shock hazard is obviated. In certain embodiments the relay devices exert opposing forces. In other embodiments, the relay devices produce movements which normally offset each other.

---

This invention relates to electrically heated glass panels and pertains particularly to control devices for obviating any electrical shock hazard when such glass panels are accidentally broken. The invention is also applicable to other similar protective control devices.

An electrically heated glass panel generally comprises a plurality of parallel panes of glass. However, in some cases, the panel may comprise a single pane. An electrical heating element is provided to heat the glass. Generally, the heating element is in the form of an electrically conductive coating, layer or the like on one of the inaccessible surfaces of one of the panes. The glass panel is heated by causing an electrical current to pass through the electrically conductive coating. Electrically heated glass has many applications but is particularly useful for refrigerator doors. Display type refrigerator doors, utilizing electrically heated glass, are frequently employed on refrigerated cabinets and compartments for super-markets and other stores, to hold frozen foods, ice cream, dairy products, beverages, and other commodities which require refrigeration. The electrical heating of the glass prevents condensation of moisture on the glass. Unless electrically heated glass is used, such condensation tends to occur under conditions of high atmospheric humidity even though the glass is of the insulating type having a plurality of parallel panes with dead air spaces therebetween. Under normal conditions electrically heated glass does not present any shock hazard, because the heating element is between the panes of glass and is inaccessible. However, if breakage of the glass occurs due to some accident, the electrically conductive coating, or other heating element, may become accessible to the touch so that an electrical shock hazard may possibly exist.

The general object of the present invention is to deal with the problem of obviating any such shock hazard when electrically heated glass is accidentally broken.

A further object is to provide a new and improved control device which disconnects the electrical power completely from the electrically heated glass panel in the event that the panel is broken, so that not even any leakage current is supplied to the glass panel. In this way, there is no shock hazard.

Another object is to provide a new and improved control device which supplies normal operating power to the electrically heated glass panel, as soon as electrical power is supplied to the control device.

The antishock control device of the present invention preferably comprises switching means connected between the power line and the load circuit, to which the heating element is connected. Such switching means preferably comprise normally closed relay contacts, so that power is supplied immediately to the heating element, when the power line is energized. The line voltage operates a first relay device which tends to open the contacts. However, the action of the first relay device is normally nullified by a second relay device, responsive to the load current. Such relay devices may involve either bimetals or magnetic solenoids. There may be a balancing of opposing forces between the relay devices, or a balancing of offsetting movements. If the load current is interrupted, the first relay device predominates so that the contacts are opened. Thus, the load circuit is completely disconnected from the power line.

Further objects and advantages of the present invention will appear from the following description taken with the accompanying drawings, in which.

Figure 1:
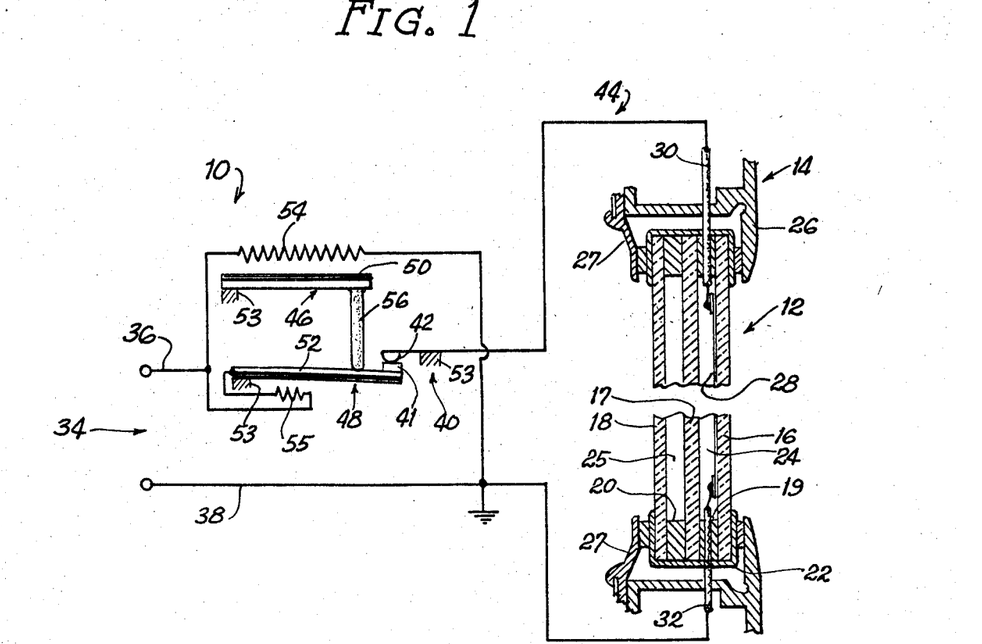
FIG. 1 is a circuit diagram showing an antishock control device or circuit to be described as one illustrative embodiment of the present invention.

As illustrated in FIG. 1, the invention is embodied in an antishock control device or circuit 10 which is employed to control the supply of electrical power to an electrically heated glass panel 12. The invention may also be applied to other similar control devices. Electrically heated glass panels are applicable to refrigerators of all kinds, both domestic and commercial and to various other types of equipment, but are particularly valuable for display type refrigerators to be employed to hold merchandise in supermarkets and other stores. Thus, the illustrated panel 12 is mounted in a display refrigerator door 14, which may be of the general type disclosed and claimed in the Kurowski Patent Nos. 2,987,782 and 3,131,421.

The illustrated glass panel 12 comprises three parallel panes 16, 17 and 18 with spacers 19 and 20 between the edge portions thereof. However, the panel may comprise more or less than three panes. Thus, the panel may have one, two, four or even more panes of glass.

The edges of the illustrated panes 16, 17 and 18 are enclosed by a channel-shaped member 22. Insulating spaces 24 and 24 are provided between the panes 16–18. Normally, the spaces 24 and 25 are filled with dry air which provides good heat insulation and obviates any condensation of moisture within the spaces. The door 14 comprises a frame 26, preferably made of metal, in which the glass panel 12 is mounted. Removable moldings 27 may be employed to retain the panel 12 in the frame 26.

The glass panel 12 is adapted to be heated by an electrical heating element, which preferably takes the form of an electrically conductive coating or layer 28 on one of the inaccessible surfaces of the panes 16–18. Such coatings will be known to those skilled in the art. The coating 28 is preferably transparent so that it does not interfere with visibility through the glass panel. The coating 28 may be intimately bonded or fused to the glass pane. In the illustrated construction, the conductive coating 28 is on the rear or inner surface of the front pane 16.

Suitable leads 30 and 32 are connected to the conductive coating 28 adjacent the opposite edges of the glass panel 12. The leads 30 and 32 are brought out of the door so that electrical power may be supplied to the heating element.

The circuit for deriving the electrical power comprises a power line 34, including line wires 36 and 38. The power line 34 is adapted to receive alternating current at 115 volts and 60 cycles or any other suitable voltage and frequency.

The antishock control device 10 is connected between the power line 34 and the heating element 28, and is effective to supply full electrical power to the heating element during normal operation, so that the glass will be heated to prevent condensation of moisture on the glass. In the event that the glass panel 12 is broken, due to some accident, the control device 10 completely disconnects the electrical power from the glass panel 12, so that no shock hazard will exist, even though the broken edges of the conductive coating 28 are accessible to the touch.

In the illustrated control device 10, the supply of electrical power is controlled by switching means 40, preferably comprising a pair of relay contacts 41 and 42. It will be seen that the contacts 41 and 42 are connected in series with the load circuit 44, which comprises the heating element 28 and the leads 30 and 32. In the illustrated construction, the contacts 41 and 42 are normally closed, so that full power is immediately supplied to the heating element 28, when the line voltage is applied to the power line 34.

The antishock control device 10 comprises a first relay operating device 46, which is effective to open the contacts 41 and 42 in the event that the load current is interrupted, and a second relay operating device 48 which maintains the contacts 41 and 42 in a closed condition during normal operation. When normal load current is flowing, the second relay operating device 48 is effective to overpower the first relay operating device 46.

In the embodiment of FIG. 1, the relay operating devices 46 and 48 comprise first and second bimetals 50 and 52, adapted to curl or bend when they are heated. One end of each bimetal is free, while the other end is mounted on a stationary support 53, which preferably is substantially rigid. The first relay operating device 46 is responsive to the line voltage supplied by the power line 34. Thus, the first bimetal 50 is provided with a heater 54 which is connected to the power line 34. The illustrated heater 54 is connected directly between the wires 36 and 38 of the power line 34.

The second relay operating device 48 is responsive to the load current. Thus, the arrangement is such that the load current heats the bimetal 52, by flowing directly through the bimetal, or through a separate heating resistor, or both. In FIG. 1, the load current passes through the bimetal 52, and also through a separate heating resistor 55, adjacent the bimetal. Thus, the bimetal 52 and the resistor 53 are connected in a series circuit with the contacts 41 and 42, between the power line 34 and the heating element 28. As shown, the contact 41 is mounted on the free end of the bimetal 52. The stationary end of the bimetal 52 is connected to the line wire 36 through the resistor 53. The other contact 42 is connected to the heating element 28.

The contact 41 is adapted to be operated by the bimetal 52, by virtue of the fact that the contact 41 is mounted directly on the bimetal. Means are provided whereby the bimetal 50 is able to open the contacts 41 and 42 when the load current is interrupted. As shown, such means comprise an insulating push rod or member 56 connected between the bimetals 50 and 52. The illustrated member 56 is mounted on the bimetal 50 and is engageable with the bimetal 52.

Initially, before electrical power is supplied to the power line 34, the contacts 41 and 42 are closed. When the line voltage is applied between the power line wires 36 and 38, the full load current flows through the bimetal 52, the resistor 53, and the contacts 41 and 42 to the heating element 28. The load current causes heating of the bimetal 52, due to the combined resistance of the bimetal and the resistor 53. Such heating tends to cause the bimetal 52 to curl upwardly, so as to maintain the contacts 41 and 42 in a closed condition.

The application of the line voltage to the power line wires 38 causes the flow of a current through the heater 54, so that the bimetal 50 is heated. The heating of the bimetal 50 tends to cause it to curl downwardly. However, the bimetals 50 and 52 are constructed so that the bimetal 52 develops a greater force than the bimetal 50. Thus, the bimetal 52 overpowers the bimetal 50 so that the bimetal 50 is not able to open the contacts 41 and 42. The contacts remain closed during normal operation, despite the effort of the bimetal 50 to open the contacts.

Figure 2:
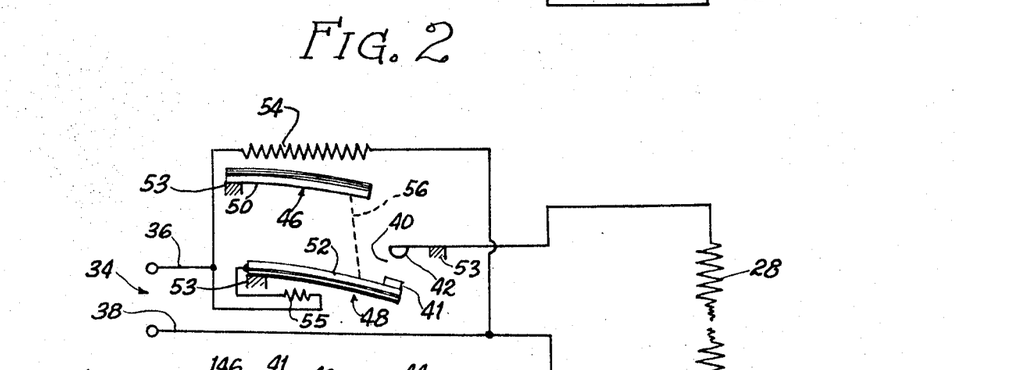
FIG. 2 is a circuit diagram similar to FIG. 1, but showing the manner in which the electrical power is completely disconnected from the load circuit in the event that the load current is interrupted.

In the event that the glass panel 12 is broken, due to some accident, the load current is interrupted, because of the open circuit in the heating element 28. The interruption of the load current terminates the heating of the bimetal 52. However, the bimetal 50 continues to be heated, due to the line voltage across the power line wires 36 and 38. The line voltage continues to energize the heater 54. Thus, the bimetal 50 is able to flex the bimetal 52 downwardly, so as to open the contacts 41 and 42.

The opening of the contacts 41 and 42 completely disconnects the load circuit 44 from the power line 34, so that the broken heating element 28 will not present any shock hazard. It will be noted that the contacts 41 and 42 are connected between the load circuit 44 and the ungrounded power line wire 36. The other power line wire 38 is grounded so that it does not present any shock hazard.

When the electrical power is disconnected from the power line 34, the bimetal 50 is no longer heated, so that it resumes its initial position as shown in FIG. 1. Thus, the contacts 41 and 42 return to their closed position, so that the load circuit 44 will be energized when the power line 34 is again supplied with electrical power, after the glass panel 12 has been replaced with a new unit.

It will be recognized that full power is supplied immediately to the heating element 28, as soon as the power line 34 is energized. There is no warm-up or other delay. As long as the normal load current flows, it heats the bimetal 52 so that the contacts 41 and 42 remain closed, despite the effort of the bimetal 50 to open the contacts. When the breakage of the heating element 28 interrupts the load current, the bimetal 50 is able to open the contacts 41 and 42, with the result that the broken heating element is completely disconnected from the power line wire 36, so that there is no shock hazard.

Figure 3:
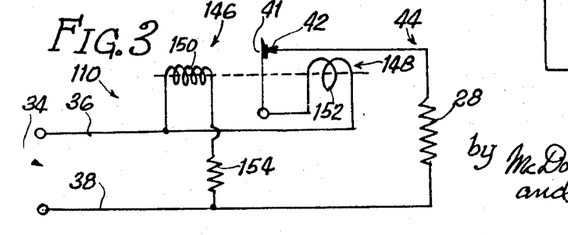
FIG. 3 is a circuit diagram of a modified antishock control device utilizing magnetic relay components rather than bimetals.

FIG. 3 illustrates a modified anti-shock control device 110, in which the thermal relay devices 46 and 48 are replaced with magnetic relay devices 146 and 148. As before, the contacts 41 and 42 are normally closed. The magnetic relay device 146 comprises a solenoid or coil 150 which tends to open the contacts 41 and 42. However, the contacts 41 and 42 are normally held in a closed position by the magnetic relay device 148 which comprises a solenoid or coil 152 adapted to carry the load current. The strength of the solenoid 152 is greater than that of the solenoid 150, so that the solenoid 152 normally overpowers the solenoid 150. As shown in FIG. 3, the solenoid 152 is connected in series with the contacts 41 and 42, between the ungrounded power line wire 36 and the heating element 28. The solenoid 150 is connected between the power line wires 36 and 38 so that the solenoid 150 will be voltage responsive. The strength of the solenoid 150 may be diminished by connecting a resistor 154 in series with the solenoid.

Initially, the contacts 41 and 42 are closed. When power is applied to the power line 34, the full load current flows through the solenoid 152 and the contacts 41 and 42 to the heating element 28. The force developed by the solenoid 152 holds the contacts 41 and 42 in a closed position, against the opposite force developed by the solenoid 150.

If the load current is interrupted, due to breakage of the heating element 28 or otherwise, the solenoid 152 is deenergized. The continuing force of the solenoid 150 is then effective to open the contacts 41 and 42, so that the load circuit is completely disconnected from the ungrounded power line wire 36. Thus, the broken heating element 28 does not present any shock hazard.

Figure 4:
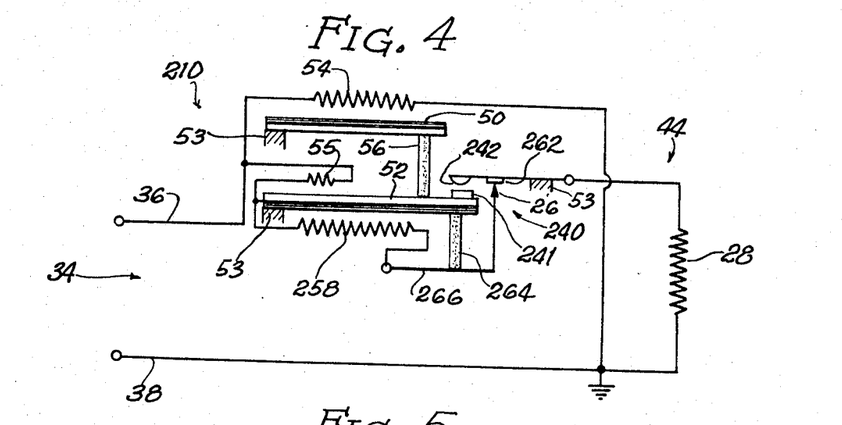
FIG. 4 is a circuit diagram illustrating the initial condition of another modified antishock control device.
Figure 5:
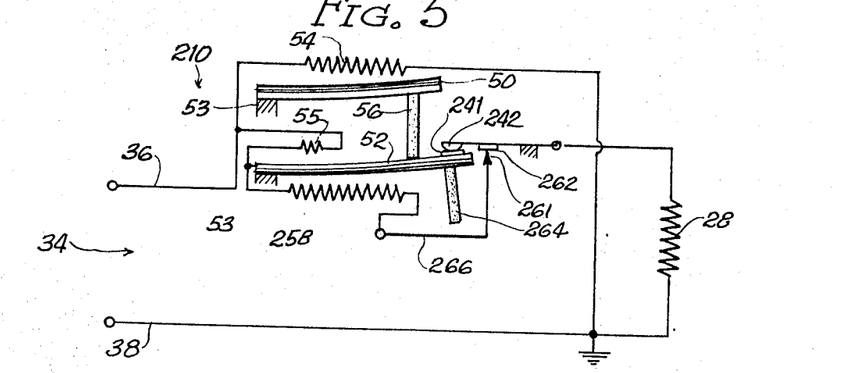
FIG. 5 is a circuit diagram similar to FIG. 4, but showing the condition of the device during normal operation, when normal load current is flowing.
Figure 6:
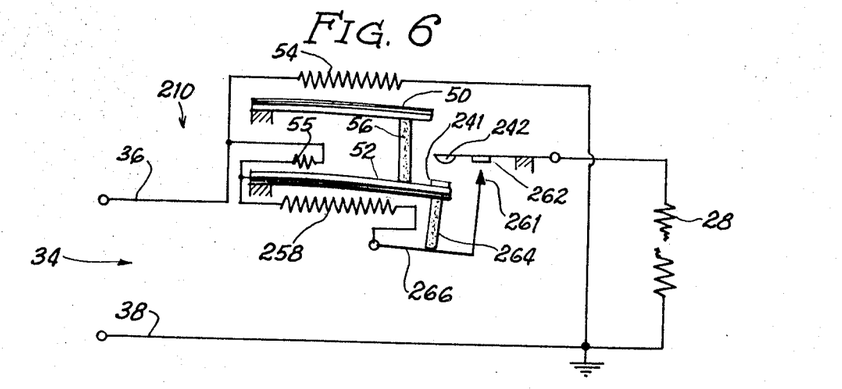
FIG. 6 is a circuit diagram similar to FIG. 4, but showing the manner in which the power is disconnected from the load circuit when the load current is interrupted.

FIGS. 4–6 illustrate another modified antishock control device 210 having modified switching means 240, including main contacts 241 and 242 which are normally open. These contacts 241 and 242 replace the normally closed contacts 41 and 42 of FIG. 1. As before, the contacts 241 and 242 are connected in series with the bimetal 52 and the resistor 55 between the ungrounded power line wire 36 and the heating element or load 28.

The arrangement of the bimetal 50 and the heater 54 is substantially the same as previously described. However, the other bimetal 52 is provided with a separate heater 258 which is employed to heat the bimetal 52 rapidly, when electrical power is first supplied to the power line 34. The heater 258 is connected in series with additional contacts 261 and 262 between the ungrounded power line wire 36 and the load 28. The series circuit comprising the heater 258 and the contacts 261 and 262 is connected in parallel with the series circuit comprising the bimetal 52 and the contacts 241 and 242.

It will be seen that the additional contacts 261 and 262 are normally closed. Thus, the initial current flows through the heater 258 and the contacts 261 and 262 when electrical power is first supplied to the power line 34. The heater 258 heats the bimetal 52 and causes it to curl upwardly, as shown in FIG. 5, with the result that the contacts 241 and 242 are closed. Most of the load current then flows through the bimetal 52 and the contacts 241 and 242, rather than through the heater 258. The load current heats the bimetal 52 due to the combined resistance of the bimetal and the resistor 55. In this way, the upward curl of the bimetal 52 is maintained, so that the contacts 241 and 242 are held in a closed position.

As before, the bimetal 52 overpowers the bimetal 50, which tends to open the contacts 241 and 242. The bimetal 50 is heated by the heater 54 but is prevented from curling downwardly, due to the greater strength of the bimetal 52. As before, the heater 54 is energized directly from the power line 34.

If breakage of the heating element 28 occurs, the load current is interrupted. Thus, the heating of the bimetal 52 is terminated, with the result that the bimetal relaxes and returns to its original shape. The downward force exerted by the bimetal 50 accelerates the downward movement of the bimetal 52, so as to open the main contacts 241 and 242. Means are also provided so that the bimetal 50 opens the additional contacts 261 and 262. Various arrangements might be provided in this regard. As shown, an insulating push rod or member 264 is connected between the bimetal 52 and a spring arm 266 on which the contact 261 is mounted. The illustrated push rod 264 is mounted on the bimetal 52 and is engageable with the spring arm 266. When the bimetal 50 causes downward movement of the bimteal 52, as shown in FIG. 6, the push rod 264 causes downward movement of the spring arm 266, so that the contact 261 is moved from the contact 262. As long as electrical power is supplied to the power line 34, the heater 54 continues to heat the bimetal 50, so that it holds both the main contacts 241 and 242 and the additional contacts 261 and 262 in their open positions. Thus, the load 28 is completely disconnected from the ungrounded power line wire 36, so that there is no shock hazard in the load circuit.

The antishock control device 210 returns to its initial condition when the electrical power is disconnected from the power line 34. The load 28 may then be repaired. When electrical power is again supplied to the power line 34, the load will be energized, as before.

The additional heater 258 of the control device 210 shown in FIGS. 4–6 provides quick initial heating of the bimetal 52. After the initial heating, the load current, flowing through the bimetal 52 and the resistor 53, generates sufficient heat to maintain the temperature of the bimetal. The full power is supplied as soon as the main contacts 241 and 242 are closed by the heating of the bimetal 52. When the load current is interrupted or substantially diminished, the load is completely disconnected from the ungrounded power line wire 36 by the action of the voltage responsive bimetal 50.

The resistance of the additional heating resistor 258 may be varied over a wide range. In one embodiment, the resistor 258 may have a relatively high value, such as 20,000 ohms, for example, so that most of the line voltage appears across the resistor when the line voltage is applied initially to the antishock control device. The resistor 258 produces quick heating of the bimetal 52, so that the bimetal curls upwardly to close the contacts 241 and 242. Full power is then applied to the load 28 through the bimetal 52 and the external heating resistor 55. The heat generated in the bimetal 52 and the resistor 55 is sufficient to maintain the upwardly curled position of the bimetal.

The high value of the resistor 258 has the advantage that there is no shock hazard in the load circuit when the line voltage is initially applied to the antishock control device. Thus, the person who is responsible for initially energizing the heater system is protected against any electrical shock which might result from accidental contact with the ungrounded lead to the heating element 28. The value of the resistor 258 is sufficiently high to limit the current to the load circuit, so that any initial shock hazard will be obviated.

In another embodiment, the additional heating resistor 258 may have a relatively low value of resistance, so that nearly the full power will be applied to the load 28, as soon as the line voltage is applied to the antishock control device. With this arrangement, there is only a small initial voltage drop in the heating resistor 258. As before, the heat generated by the resistor 258 causes the bimetal 252 to curl upwardly, so as to close the contacts 241 tand 242.

FIGS. 7–12 illustrate another modified antishock control device 310 which is somewhat similar to the device 10 of FIGS. 1 and 2, but uses the principle of off-setting or nullifying movements, rather than the principle of opposing forces. The antishock control device 310 of FIG. 7 comprises voltage responsive and current responsive relay devices for producing offsetting movements during normal operation, so that the contacts 41 and 42 for the load 28 are kept closed. This is in contrast with the device 10 of FIG. 1, in which the voltage responsive and current responsive relay devices produce opposing forces. If the load current is interrupted or substantially diminished, the voltage responsive relay device predominates with the result that the load is disconnected from the ungrounded power line 36.

Figure 7:
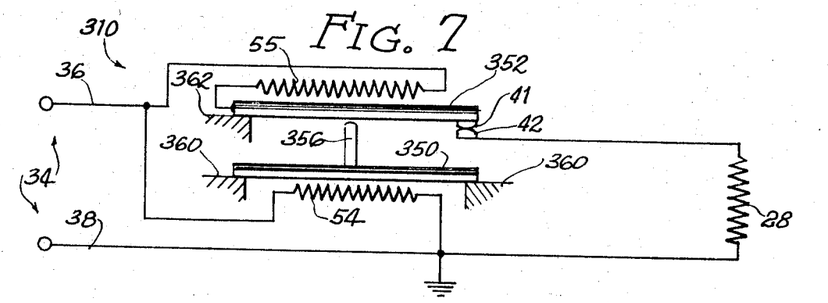
FIG. 7 is a schematic diagram of another antishock control device, involving the offsetting movements of two bimetals, rather than the opposition of forces between bimetals.

It will be seen from FIG. 7 that the electrical circuit is the same as in FIG. 1. The corresponding electrical components have been given the same reference characters. However, the bimetal relay devices 50 and 52 of FIG. 1 are replaced with bimetal relay devices 350 and 352 in FIG. 7. The bimetals 350 and 352 are somewhat different in construction and arrangement from the bimetals 50 and 52, previously described.

The bimetals 350 and 352 of FIG. 7 are supported as simple beams. This is in contrast with the bimetals 50 and 52, which are supported as cantilever beams. It will be recalled that one end of each of the bimetals 50 and 52 is supported in a fairly rigid manner, while the other end is free, except for the restraint imposed by the contacts 41 and 42 and the pin 56. In the case of FIG. 7, the ends of the bimetal 350 are supported in such a manner that the end supports do not afford any great resistance to bending or curling of the bimetal. The simple beam and supports for the bimetal 350 are designated 360 in FIG. 7.

In the case of the bimetal 352, one end of the bimetal has a simple beam and support 362 which offers only a slight resistance to curling or bending of the bimetal 352. The other end of the bimetal is restrained by the contacts 41 and 42.

In the antishock control device 310 of FIG. 7, the bimetals 350 and 352 have the same orientation, so that they both will curl in the same direction when heated. This is in contrast with the construction of FIGS. 1 and 2, in which the bimetals 50 and 52 are oppositely oriented, so that they tend to curl in opposite directions when heated.

Figure 9:
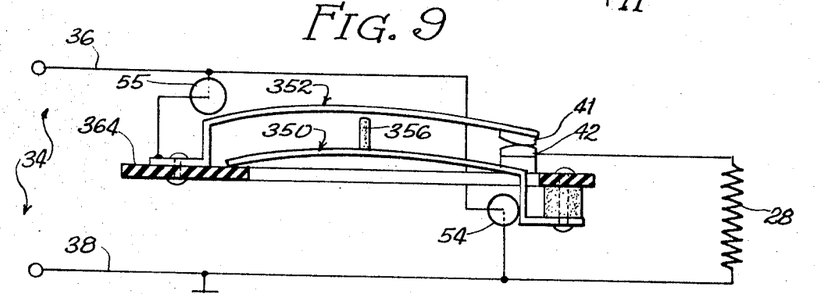
FIG. 9 is a view similar to FIG. 8, but showing the change of position during normal operation when load current is flowing in the load circuit.
Figure 10:
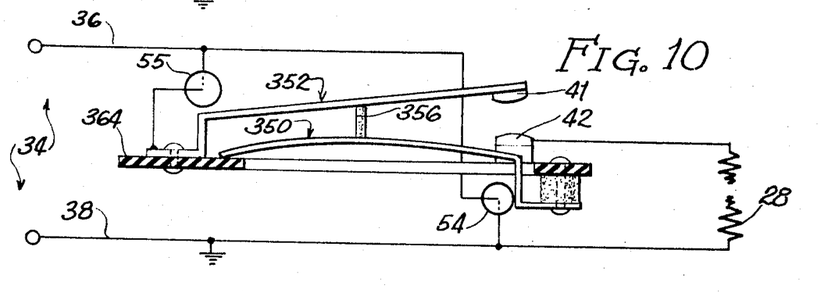
FIG. 10 is a view similar to FIGS. 8 and 9, but showing the change of position which occurs when the load current is interrupted.
Figure 11:
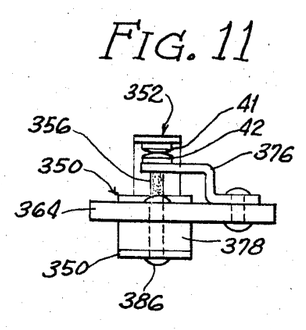
FIG. 11 is an end view of the device of FIG. 8, taken generally as indicated by the line 11—11 in FIG. 8.

In the construction of FIG. 7, the interconnecting member between the bimetals 350 and 352 is in the form of an insulating pin 356 which is connected to the mid-portions of the bimetal 350 and is engageable with the mid-portion of the bimetal 352. The pin 356 is preferably spaced slightly from the bimetal 352 when the bimetals are in their initial positions, as shown in FIG. 7, and also during normal operation, as shown in FIG. 9. This arrangement of the pin 356 is in contrast with the construction of FIG. 1, in which the pin 56 is connected to the end portion of the bimetal 50 and is engaged with the bimetal 52 during normal operation.

FIGS. 9–12 illustrate various detailed features of the antishock control device 310, which is shown schematically in FIG. 7. The simple beam support 362 for the bimetal 352 is illustrated as comprising a flat, fairly rigid board or base member 364, preferably made of an electrically insulating material. The bimetal 352 is illustrated as comprising an L-shaped mounting portion 366, having horizontal and vertical legs 368 and 370. The horizontal leg 368 is secured to the board 364, by means of a rivet 372, or any other suitable fastening means. The vertical leg 370 extends between the horizontal leg 368 and the main horizontal portion 374 of the bimetal 352. It is preferred to form the various portions 368, 370 and 374 in one piece.

As before, the contact 41 is mounted on the free end of the bimetal 352. The contact 41 is restrained by the contact 42, which is mounted or formed on a fairly rigid bracket 376, riveted or otherwise secured to the mounting board 364, as shown to best advantage in FIG. 11.

Figure 12:
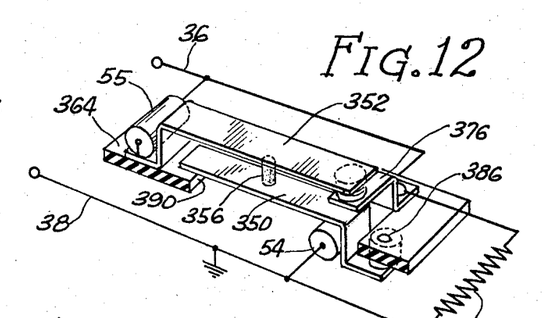
FIG. 12 is a sectional perspective view showing the antishock control device of FIG. 8.

The simple beam supports 360 for the bimetal 350 are illustrated as comprising a stand-off member or block 378, mounted or formed on the insulating board 364. The bimetal 350 is illustrated as comprising an L-shaped mounting portion 380 having horizontal and vertical legs 382 and 384. The horizontal leg 382 is secured to the standoff member or block 378, by means of a rivet 386, or any other suitable fastening means. A vertical leg 384 extends upwardly from the horizontal leg 380 to the main horizontal portion 388 of the bimetal 350. It will be seen that the vertical leg 384 extends through an opening or slot 390 in the mounting board 364.

The illustrated bimetal 350 has a free end portion 392 which rests against and is supported by the insulating board 374. In this way, the board 364 provides a simple beam support for the free end portion 392.

Figure 8:
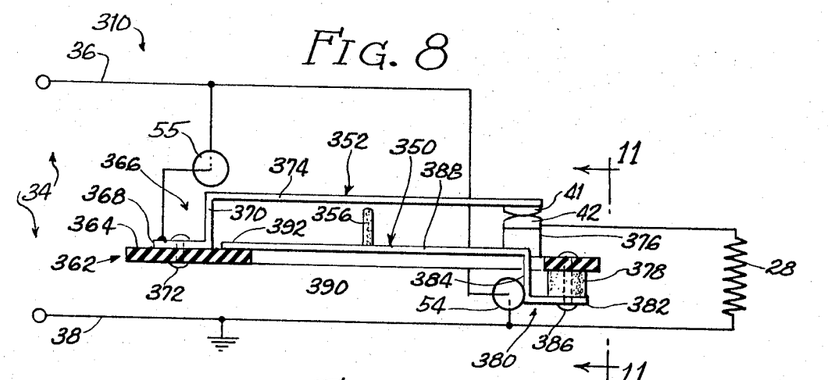
FIG. 8 is a diagrammatic elevational section showing the antishock control device of FIG. 7 in its initial position, before electrical power is supplied to the device.

The operation of the antishock control device 310 will be evident from FIGS. 7–9. FIG. 7 represents the initial condition, before the line voltage is applied to the antishock control device 310. The contact 41 engages the contact 42. Thus, full power will be supplied to the load 28, as soon as the normal voltage is applied between the line wires 36 and 38. Preferably, the inner connecting pin 356 is slightly spaced from the bimetal 352. However, the pin 356 could be lightly engaged with the bimetal 352.

When the line voltage is applied between the lines 36 and 38, the bimetal 350 is heated by the resistor 54, which draws current directly from the lines 36 and 38. The bimetal 352 is heated by the flow of the load current through the bimetal itself and the external heating resistor 55. The heating of both bimetals 350 and 352 causes them to curl so that they are convexed upwardly as shown in FIG. 9. The curling of the bimetals 350 and 352 causes the mid-portions of both bimetals to move upwardly. Thus, the relation between the bimetals and the pin 356 is substantially unchanged. A small spacing preferably still exists between the pin 356 and the bimetal 352. The upward movement of the bimetal 350 offsets or nullifies the upward movement of the bimetal 350 and the pin 356. Accordingly, the contact 41 remains in engagement with the contact 42. There is actually an increase in the pressure between the contacts 41 and 42, due to the curling of the bimetal 352.

If the load current is interrupted or substantially diminished, the heating of the bimetal 352 is terminated or substantially reduced, with the result that the bimetal 352 uncurls or straightens out. As clearly shown in FIG. 10, the straightening of the bimetal 352 causes it to swing downwardly against the pin 356, which resists any further downward movement. Further straightening of the bimetal 352 causes the contact 41 to move in from the contact 42. In this way, the load 28 is completely disconnected from the ungrounded lead 36 of the power line 34.

When the voltage is disconnected from the line wires 36 and 38, both bimetals 350 and 352 are allowed to cool so that they straighten out into their initial positions, as shown in FIG. 8.

During normal operation as shown in FIG. 9, the two bimetals 350 and 352 provide compensation for changes in the ambient temperatures. Any increase in the ambient temperature tends to cause both bimetals 350 to curl to a greater extent. The movement of the bimetal 352 offsets or compensates for the movement of the bimetal 350.

Figure 13:
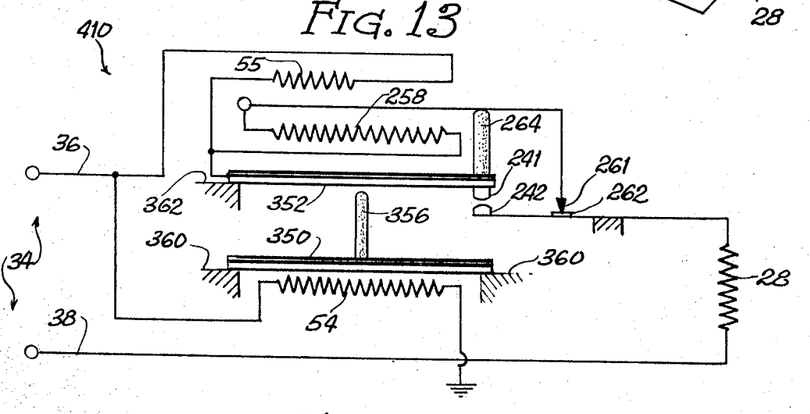
FIG. 13 is a schematic diagram of another embodiment, similar to the embodiment of FIG. 4, but involving the balancing of movements, rather than the opposition of forces.
Figure 14:
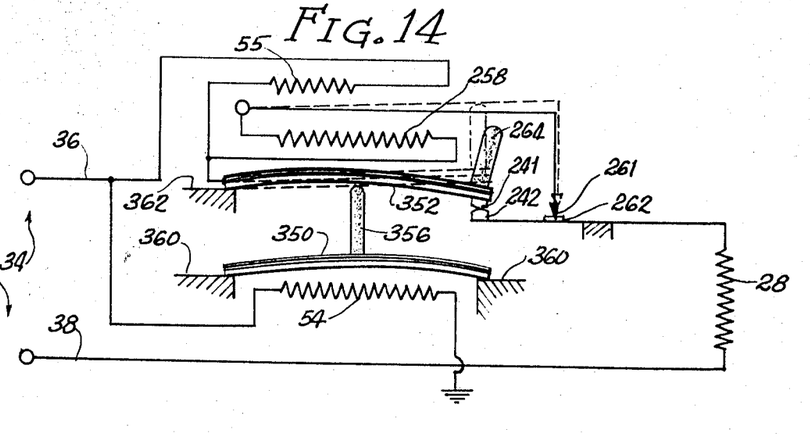
FIG. 14 is a view similar to FIG. 13, but showing the manner in which the load circuit is disconnected from the power line when the normal load current is interrupted.

FIGS. 13 and 14 illustrate still another antishock control device 410 which is somewhat similar to the control device 210 of FIGS. 4–6. However, the control device 410 is also similar to the control device 310, in that it uses the principle of compensating movements rather than the principle of opposing forces. Thus, the antishock control device 410 of FIGS. 13 and 14 employs the bimetals 350 and 352, as described in connection with FIGS. 7–12. The electrical circuit is the same as illustrated in FIGS. 4–6.

FIG. 13 represents the initial condition of the antishock control device 410. The contact 241 is out of engagement with the contact 242. When the normal line voltage is applied between the lines 36 and 38, the bimetal 352 is heated by the current through the resistor 258, which also flows through the resistor 55, the contacts 261 and 262, and the load 28. The bimetal 352 curls so that it is convexed upwardly. The curling of the bimetal causes the contact 241 to move against the contact 242. As a result, full power is supplied to the load 28 through the resistor 55 and the bimetal itself. The heating effect of the load current in the bimetal 352 and the external resistor 55 maintains the curled position of the bimetal.

The line voltage produces current in the resistor 54, which heats the bimetal 350, so that it curls into an upwardly convex position, as shown in FIG. 14. The upward curling of the bimetal 352 compensates for the upward curling of the bimetal 350 so that the upward movement of the pin 356 does not open the contacts 241 and 242. There is preferably a small spacing between the pin 356 and the bimetal 352.

When the load current is interrupted or substantially diminished, the bimetal 352 straightens out so that it engages the pin 356. The free end of the bimetal 352 then moves upwardly, so that the contact 341 is disengaged from the contact 342. The pin or operating member 264, secured to the bimetal 352, causes the movement of the contact 261, away from the contact 262. A straightened position of the bimetal 352 is shown in broken lines in FIG. 13. Thus, the load 28 is completely disconnected from the ungrounded power line 36.

The antishock control devices 310 and 410 of FIGS. 7–14 are very dependable in operation. They provide automatic compensation for variations in the ambient temperature. They have the further advantage that they will act to prevent any shock hazard when the load current is either interrupted or substantially diminished. This feature is especially valuable when the load comprises a plurality of heating elements in parallel. If one of the heating elements is broken, the load current will be substantially diminished, but a reduced load current will still flow in the remaining heating element or elements. The antishock control devices will nevertheless disconnect the heating elements from the ungrounded power line to obviate any shock hazard, due to the broken heating element.

Various other modifications, alternative constructions and equivalents may be employed without departing from the true spirit and scope of the invention, as exemplified in the foregoing description and defined in the following claims.

I claim:

1. Electrical heating apparatus, comprising the combination of a glass panel having an inaccessible surface with a heating element thereon,
   a power line for receiving electrical power,
   switching means connected between said power line and said heating element,
   first means tending to open said switching means in response to the application of power to said power line,
   and second means responsive to the load current through said heating element for nullifying the action of said first means and causing closure of said switching means,
   said first means being effective to open said switching means in the event that the load current through said heating element is interrupted due to breakage thereof or otherwise while electrical power is still being received by said power line,
   the opening of said switching means being effective to obviate any shock hazard in the event of breakage of said glass panel.

2. Apparatus according to claim 1, in which said switching means comprise a pair of normally closed relay contacts,
   said first means comprising a voltage responsive element connected across said power line,
   said second means comprising a current responsive element connected to carry the normal load current to said heating element.

3. Apparatus according to claim 1, in which said switching means comprise a pair of contacts connected between said power line and said heating element,
   said first means comprising a first bimetal with a first heater connected across said power line,
   said second means comprising a second bimetal with heating means for carrying the normal load current to said heating element,
   said first and second bimetals being connected in opposition to said contacts whereby heating of said first bimetal tends to open said contacts while heating of said second bimetal is effective to overpower said first bimetal so as to maintain the initial closure of said contacts.

4. Apparatus according to claim 3, in which said heating means for said second bimetal comprise a circuit arrangement for causing the load current to flow along said second bimetal and cause heating thereof.

5. Apparatus according to claim 3, in which said heating means for said second bimetal comprise a heater disposed adjacent said second bimetal.

6. Apparatus according to claim 1, in which said switching means comprises a pair of normally closed relay contacts,
   said first means comprising a voltage responsive coil tending to open said contacts and connected across said power line,
   said second means comprising a current responsive coil tending to close said contacts and capable of overcoming said voltage responsive coil.

7. Apparatus according to claim 1, in which said switching means comprise a pair of contacts connected between said power line and said heating element,
   said first means comprising a first bimetal with a first heater connected across said power line,
   said second means comprising a second bimetal connected in series with said contacts whereby the load current through said contacts causes direct heating of said second bimetal,
   said second means comprising a second heater adjacent said second bimetal,
   a second pair of contacts,
   and means connecting said second heater and said second contacts in a circuit which is in parallel with the circuit formed by said first mentioned contacts and said second bimetal,
   said second contacts being initially closed while said first contacts are initially open, the initial load current thereby passing through said second heater and causing said first contacts to close in opposition to said first bimetal,
   and means operable by said first bimetal for opening both said first contacts and said second contacts when the heating of said second bimetal is discontinued by the interruption of the load current.

8. An antishock control device for electrically heated glass or the like, comprising the combination of a power line for receiving electrical power,
   a load circuit adapted to be connected to the device to be protected,
   switching means connected between said power line and said load circuit for transmitting power therebetween, first means connected to said power line and tending to open said switching means in response to the application of power to said power line, and second means responsive to load current in said load circuit for nullifying the action of said first means and maintaining the closure of said switching means, said first means being effective to open said switching means in the event that the load current is interrupted while electrical power is still being received by said power line, the opening of said switching means being effective to obviate any shock hazard in said load circuit.

9. Apparatus according to claim 8, in which said switching means comprise a pair of initially closed contacts, said first means comprising a first bimetal with a first heater connected to said power line and tending to open said contacts, said second means comprising a second bimetal with heating means operable by load current in said load circuit for nullifying the action of said first bimetal and maintaining the initial closure of said contacts, said first means being effective to cause the opening of said contacts in the event that the heating of said second bimetal is diminished or discontinued by a substantial decrease or interruption of the load current.

10. Apparatus according to claim 9, in which said heating means comprise a circuit arrangement for causing the load current to flow through said second bimetal to cause direct heating thereof.

11. Apparatus according to claim 9, in which said heating means comprise a heater disposed adjacent said second bimetal.

12. Apparatus according to claim 8, in which said switching means comprise a pair of normally closed relay contacts, said first means comprising a first solenoid connected to said power line and tending to open said contacts in response to the application of voltage to said power line, said second means comprising a second solenoid connected to carry the load current and capable of nullifying the action of said first solenoid to maintain the closure of said contacts.

said first solenoid being effective to open the contacts if the load current is interrupted.

13. Apparatus to claim 8, in which said switching means comprise a first pair of normally open contacts and a second pair of normally closed contacts, said first means comprising a first bimetal having a first heater connected to said power line, said second means comprising a second bimetal, a second heater for heating said second bimetal, a first circuit connecting said first contacts and said second bimetal in series between said power line and said load circuit, and a second circuit connecting said second heater and said second contacts in parallel with said first circuit, said second circuit being effective to carry initial load current whereby said second heater causes said second bimetal to overcome said first bimetal and close said first contacts, the load current through said second bimetal thereupon being effective to heat said second bimetal and maintain the closure of said first contacts, and means operable by said first bimetal for opening both said first and second contacts if the heating of said second bimetal is discontinued by the interruption of the load current.

14. Apparatus according to claim 1, in which said first and second means comprise first and second bimetals, said first bimetal having a first heater connected to the power line, said second bimetal being arranged with second heating means for carrying the normal load current to said heating element, said first and second bimetals having means for operating said switching means whereby said first bimetal tends to open said switching means while said second bimetal is effective to prevent opening of said switching means.

15. Apparatus according to claim 1, in which said switching means comprise a pair of contacts connected between said power line and said heating element, said first means comprising a first bimetal with a first heater connected to said power line, said second means comprising a second bimetal arranged with heating means for carrying the normal load current to said heating element, one of said contacts being mounted on said second bimetal, said first bimetal having an operating member thereon extending toward said second bimetal, said second bimetal being oriented to curl when heated in a direction to cause closure of said contacts and to move away from said operating member, said first bimetal being oriented to curl when heated in a direction to move said operating member toward said second bimetal, the curling movement of said second bimetal being effective to nullify the curling movement of said bimetal as long as said second bimetal is heated by the normal load current, the second bimetal being adapted to straighten in response to substantial decrease of the load current so as to engage said operating member and open said contacts.

16. Apparatus according to claim 15, in which the ends of said first bimetal have simple beam supports, and in which said operating member extends from the mid-portion of said first bimetal toward the mid-portion of said second bimetal.

17. Apparatus according to claim 16, in which said second bimetal has a simple beam support at one end thereof, the other end of said second bimetal being restrained by the engagement of said contacts.

18. Apparatus according to claim 8, in which said switching means comprise a pair of normally closed contacts connected between said power line and said load circuit, said first means comprising a first bimetal having a heater connected to said power line, said first bimetal having compliant end supports to provide for curling movement of said first bimetal between said end supports when said first bimetal is heated, said second means comprising a second bimetal arranged with heating means for carrying the load current to said load circuit, one of said contacts being stationary while the other contact is mounted on one end of said second bimetal, the opposite end of said second bimetal having a compliant end support providing for curling movement of said second bimetal between the last mentioned end support and said contacts when said second bimetal is heated, said second bimetal being oriented so that such curling movement tends to maintain the closure of said contacts, said first bimetal having an operating member connected thereto and movable toward said first bimetal when said second bimetal is heated, the curling movement of said second bimetal being effective to nullify such movement of said operating member when the normal load current flows to said load circuit, the second bimetal being effective to straighten when the load current is reduced substantially whereby said second bimetal engages said operating member and causes the opening of said contacts.

19. Apparatus according to claim 8, in which said switching means comprise first and second normally open contacts, said first and second means comprising first and second bimetals, said first contact being stationary while said second contact is mounted on one end of said second bimetal, the other end of said second bimetal having a compliant end support, said second bimetal being oriented to curl when heated in a direction to move said second contact against said first contact so that the full load current will flow between said contacts, said first bimetal having a first heater connected to said power line, said second bimetal having second and third heating means, said second heating means being connected to carry the normal load current for maintaining the closure of said contacts, said third heating means comprising an additional heater and third and fourth normally closed contacts connected as a by-pass around said first and second contacts so that the additional heater will heat said second bimetal and cause closure of said first and second contacts in response to initial energization of said power line, said first bimetal having operating means connected thereto, said first bimetal having compliant end supports and being oriented to curl when heated in a direction to move said operating means toward said second bimetal, the curling movement of said second bimetal being effective to nullify the curling movement of said first bimetal as long as the normal load current flows to said load circuit, the second bimetal being effective to straighten so as to engage said operating means and open said first and second contacts when the load current is substantially reduced, said second bimetal having additional operating means for opening said third and fourth contacts in response to the straightening of said second bimetal.

20. Apparatus according to claim 8, in which said switching means comprise first and second contacts connected between said power line and said load circuit to carry the normal load current, said first and second means comprising first and second bimetals adapted to curl when heated, said first contact being stationary while said second contact is mounted on said second bimetal, said first bimetal having first heating means connected to said power line, said second bimetal having second heating means for carrying the normal load current, said first bimetal having operating means connected thereto, said first bimetal being oriented to curl when heated in a direction to move said operating means toward said second bimetal, said second bimetal being oriented to curl when heated in a direction to maintain closure of said contacts and to nullify the curling movement of said first bimetal as long as the normal load current flows in said load circuit, said second bimetal being effective to straighten so as to engage said operating means and open said contacts when the load current is substantially reduced.

References Cited

UNITED STATES PATENTS

| | | | |
|---|---|---|---|
| 2,403,803 | 7/1946 | Kearsley | 219—511 X |
| 2,898,433 | 8/1959 | Felt | 219—202 X |
| 2,979,597 | 4/1961 | Karlen | 219—511 |
| 3,078,361 | 2/1963 | Mason et al. | 219—511 X |
| 3,379,859 | 4/1968 | Marriott | 219—522 |

VOLODYMYR V. MAYEWSKY, *Primary Examiner.*

U.S. Cl. X.R.

219—203, 522